United States Patent Office 2,994,294
Patented Aug. 1, 1961

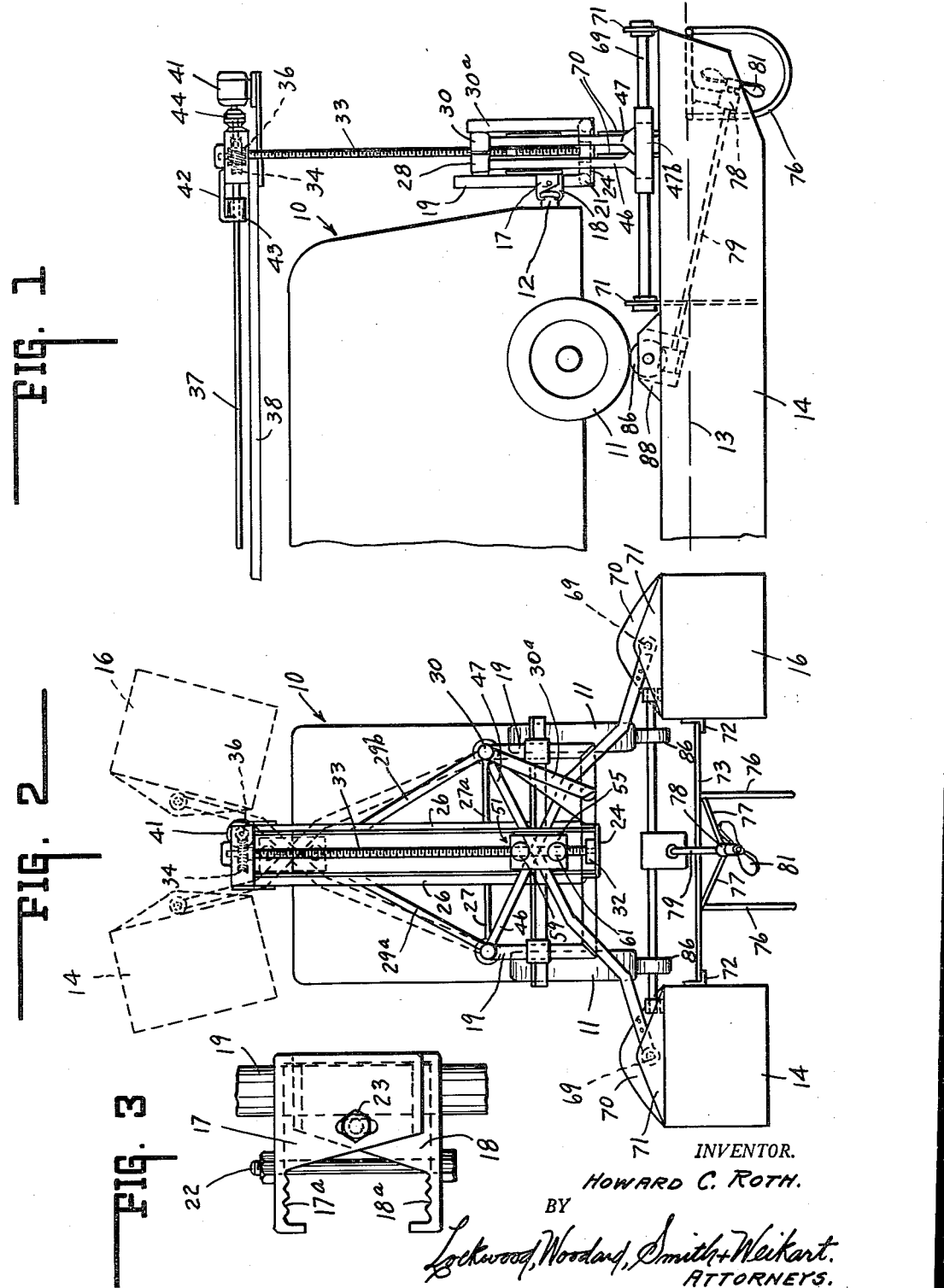

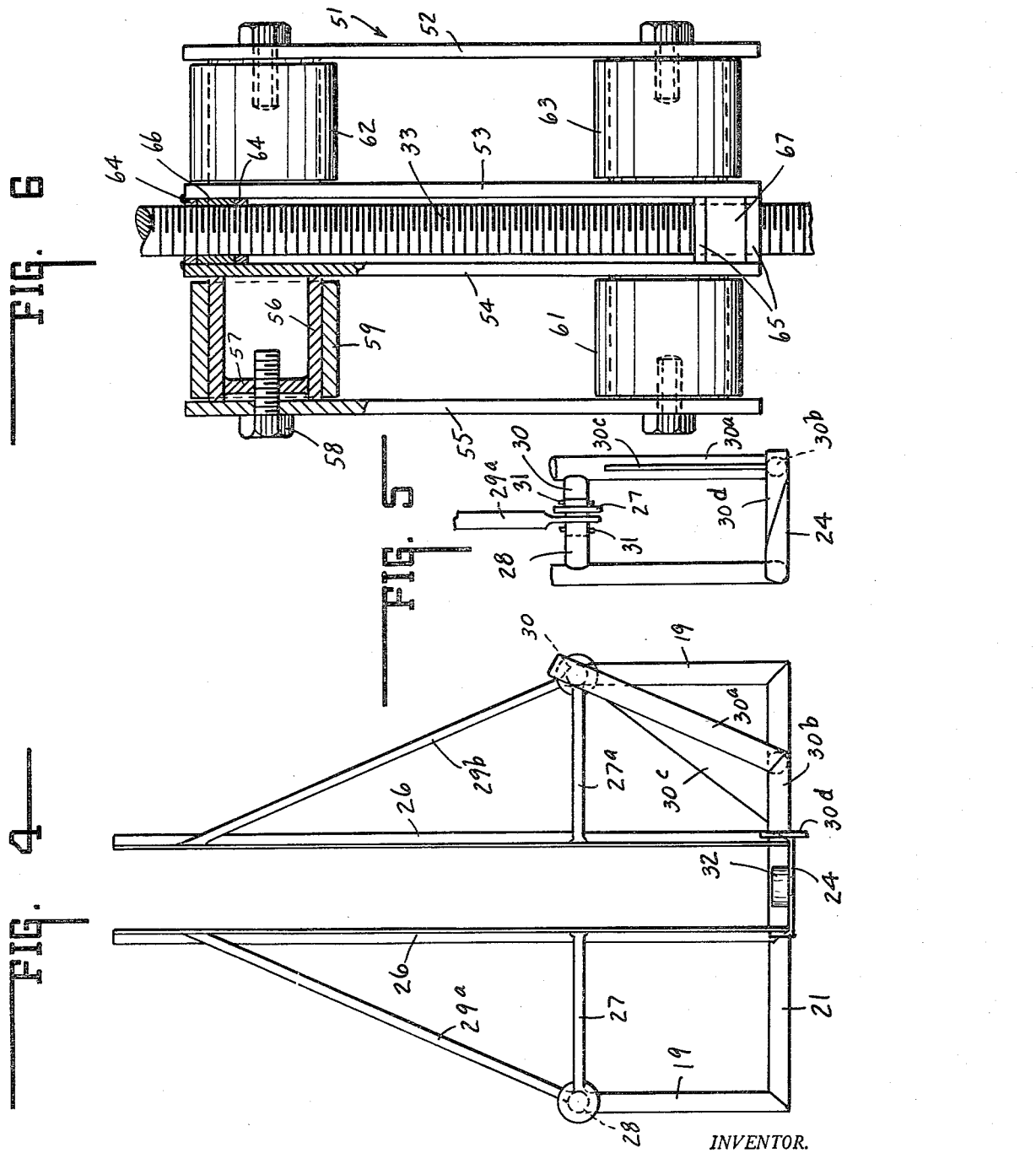

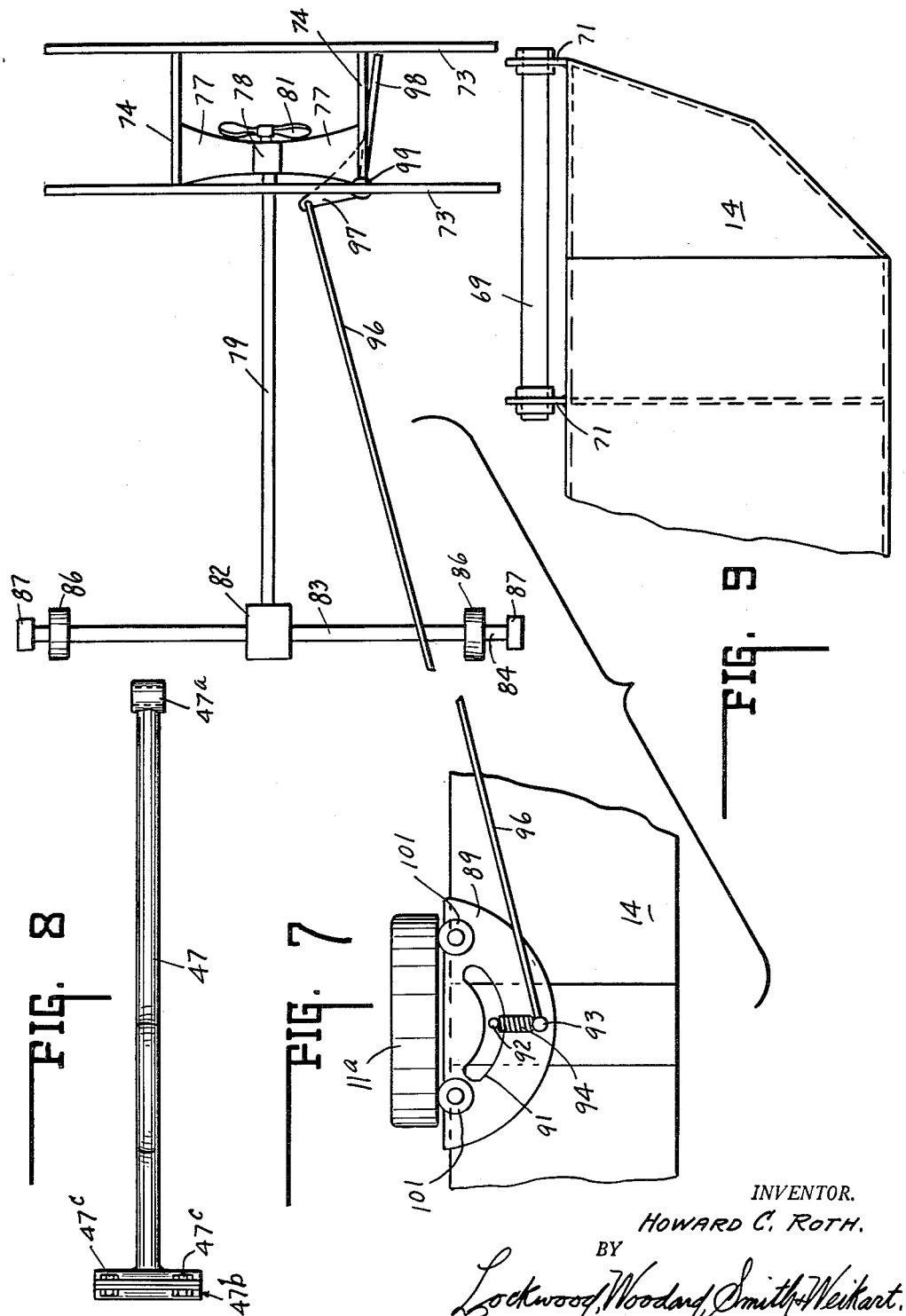

2,994,294
DETACHABLE PONTOON ASSEMBLY FOR AUTOMOBILES
Howard C. Roth, R.R. 2, Box 108, Brownsburg, Ind.
Filed Dec. 18, 1958, Ser. No. 781,381
2 Claims. (Cl. 115—1)

This invention relates generally to pontoon assemblies and in particular to a detachable pontoon assembly for rendering amphibious an automobile or the like.

The invention herein described includes two pontoons which extend along each side of an automobile. The pontoons support the vehicle in the water and are spanned by dual framework assemblies, one at the front and one at the rear of the vehicle. A driving propeller is supported on the rear framework assembly and means are provided for driving the propeller from the rear wheels of the the automobile. The rear framework assembly also carries a rudder which, by means of a mechanical linkage, is operated by positioning the front wheels of the automobile, thereby permitting the guiding of the water borne automobile through the conventional auto steering gear.

The framework assemblies are detachably clamped onto the front and rear of the vehicle. Power means are provided for raising the pontoons to an overhead, or stowed position, permitting the automobile to travel on land in conventional fashion.

It is the primary object of the present invention to provide a detachable pontoon assembly for automobiles or the like which can be conveniently moved between stowed and operating positions in a relatively short time.

A further object of the present invention is to provide a pontoon assembly which can be conveniently and rapidly installed upon or detached from a vehicle such as an automobile.

A further object of the present invention is to provide a detachable pontoon assembly for automobiles or the like which utilizes the auto engine to provide motive power when afloat, and which can be guided by the conventional automobile steering gear.

A further object of the present invention is to provide a detachable pontoon assembly having most of its component parts formed of aluminum and thus having a relatively low over-all weight.

These and other objects will become apparent as the description proceeds with reference to the accompanying drawings in which:

FIG. 1 is a side view of the rear portion of a pontoon assembly embodying the present invention shown in operative position.

FIG. 2 is an end view of the apparatus shown in FIG. 1.

FIG. 3 is a side view of a portion of the clamping component.

FIG. 4 is a rear, detail view of a further portion of the pontoon assembly.

FIG. 5 is a side view of a portion of the apparatus shown in FIG. 4.

FIG. 6 is an enlarged side view of a further portion of the pontoon assembly.

FIG. 7 is a fragmentary, top plan view of a further portion of the pontoon assembly.

FIG. 8 is a top plan view of one of the pontoon supporting arms.

FIG. 9 is a fragmentary side view of one of the pontoons.

Referring initially to FIGS. 1 and 2, the detachable pontoon assembly is shown installed upon a motor vehicle indicated generally at 10 and having rear wheels 11 and a rear bumper structure 12. The pontoon assembly is shown in FIG. 1 in its operative position, the structure being a float with the water level being indicated at 13.

The pontoon assembly includes two elongated pontoons 14 and 16 which are supported by a framework clamped to an appropriate portion of the motor vehicle. In FIGS. 1 and 2 only the rear section of the pontoon supporting framework is shown, and it will be understood that a front section is also provided, this section being identical to the rear section shown in FIGS. 1 and 2.

The pontoon assembly is shown clamped to the rear bumper 12 of the motor vehicle by means of a clamping structure which is shown in detail in FIG. 3. The clamping structure comprises two interfitting members 17 and 18 which are provided with hooked outer ends and adjacent serrated surfaces 17a and 18a. The members 17 and 18 are apertured to permit the extension therethrough of the vertical legs 19 of a U-shaped supporting structure which includes the base member 21, the structure 19—21 being shown in detail in FIGS. 4 and 5. It will be understood that while only one clamping structure is visible in FIG. 1, there is one of such structures on each of the legs 19. Referring again to FIG. 3, the clamping structure is provided with a bolt 22 adapted to tighten the serrated surfaces against the vehicle bumper and an adjusting bolt 23 which is adapted to tighten the clamping structure on the leg 19.

As may be seen in FIGS. 4 and 5 a channel shaped member 24 extends rearwardly from the central portion of the base member 21 and has secured thereto and extending vertically upward therefrom two angle irons 26. The angle irons are transversely supported by means of brace members 27 and 27a which at their outer ends are flattened and appertured to respectively receive the rearwardly extending member 28 rigidly mounted on one of the upstanding legs 19 and the forwardly extending member 30 extending horizontally from the inclined member 30a. The member 30a is joined to a horizontal member 30b (FIG. 4) which in turn is welded to a plate 30d carried by one flange of the channel 24, the plate 30d projecting rearwardly so as to displace the member 30a rearwardly of the adjacent leg 19. A gusset 30c reinforces the inclined member 30a. Angular braces 29a and 29b are similarly accommodated on the members 28 and 30 respectively and are secured at their upper ends to the angle irons 26. The braces 27, 27a and 29a and 29b may be retained upon the members 28 and 30 by means of cotter pins 31 shown in FIG. 5. It will be understood that, as shown in FIGS. 2, 4 and 5 the member 30 extends forwardly and the member 28 extends rearwardly and that the stationary inclined member 30a is rearward of (or overlies, as viewed in FIG. 2) the support arm 46. Member 30a is inclined so as to clear the adjacent support arm 46 when the arm is in its solid line position of FIG. 2.

The member 24 is apertured at 24a to mount a thrust bearing 32 which supports the lower end of a threaded shaft 33 as may best be seen in FIG. 2. The upper end of the shaft 33 carries a gear 34 which meshes with a horizontal worm gear 36. The worm gear is rotated by a shaft 37 which extends across the top of the pontoon supporting framework and at its other end carries a worm gear adapted to rotate the vertical shaft of the front framework section (not shown), this shaft being a counterpart of the shaft 33. The front and rear sections are joined by horizontally extending members 38 which are secured by means of plates 39 to each of the vertically extending angle irons 26. Mounted on this structure is a power means which may take the form of an electric motor 41 driven from the electrical supply of the motor vehicle 10 and being connected thereto by suitable, detachable electrical wiring not shown. A hanger structure 42 secured to the motor mounting carries a bearing 43 for the shaft 37. The motor is joined to the shaft 37 by means of a conventional slip clutch indicated schematically at 44 and thereby drives the shaft 37 to rotate the front and rear threaded shafts 33.

The U-shaped structure 19—21 pivotally supports two arms 46 and 47, one of the arms being shown in detail in FIG. 8. Referring to FIG. 8, one of the arm ends has secured thereto a transverse sleeve 47a which is adapted to be accommodated on and pivotally movable with relation to the front portion 48 of the member 28 (FIG. 5). The opposite end of the arm 47 is welded to one of two half sections of a bearing member indicated generally at 47b, the sections of the bearing member being detachably joined by means of bolts 47c cooperating with appropriate flanges on the bearing members.

The arm 46 has a configuration identical to arm 47 and is similarly pivotally attached to the member 30 at the area indicated by 49 in FIG. 5. The arms extend diagonally across the U-shaped supporting structure 19—21 and cross each other with the arm 47 passing to the rear of the shaft 33 and the arm 46 pass in front of the shaft 33. Means for displacing this point of crossing of the arms along the shaft are provided by a lifting element indicated generally at 51 in FIG. 2 and as shown in detail in FIG. 6.

Referring to FIG. 6, the lifting element 51 includes parallel rear plates 52 and 53 and parallel front plates 54 and 55. The front plates are joined by a sleeve 56 which is welded to the plate 54 and at its opposite end is welded to a closing plate 57 threaded to receive a screw 58. Freely accommodated on the member 56 is a roller 59 which is free to rotate about the member 56 and between the plates 54 and 55.

A similar roller structure 61 is rotatably supported between the plates 54 and 55 and is spaced below the roller 59. A similarly mounted upper roller 62 and lower roller 63 is supported between the plates 52 and 53. The two pairs of plates are held in assembled relation on the shaft 33 by means of apertured plates 64 and 65. The plates 64 and 65 are welded to the plates 53 and 54 and enclose a square nut 66 and 67 respectively, the nuts being threaded upon the shaft 33. It will be evident that rotation of the shaft 33 causes the lifting element to be displaced along the shaft. The space between the rollers 59 and 61 accommodates the arm 47 and the space between the rollers 62 and 63 accommodates the arm 46. From FIG. 2, it will be evident that movement of the lifting element along the shaft 33 thus displaces the point of crossing of the arms 46 and 47 so that as the lifting element 51 is moved from its lower solid line position of FIG. 1 to its upper broken line position of FIG. 1, the arms 46 and 47 will be moved from their solid line position to their broken line position of FIG. 1.

The tubular structures, such as indicated at 47b in FIG. 8, carried by the outer ends of the arms 46 and 47 are accommodated on horizontally extending bars 69 which are supported by transverse plates 71 carried by the pontoons, this structure being shown in detail in FIG. 9. While only the bar 69 carried by the pontoon 14 is visible in FIG. 1, it will be understood that the opposite pontoon 16 also carries a similar element accommodated in the counterpart structure carried at end of the arm 46. Triangular plates 70, bolted to the arms 46 and 47, engage the top surface of the pontoons and serve to hold them in generally transverse, horizontal position. As will be evident from FIG. 2, when the lifting element 51 is in its upper position, the pontoons will be raised from their operative position to a stowed position above the vehicle 10.

The means for driving the structure when afloat will now be described with reference to FIGS. 1, 2 and 7.

As may be seen in FIG. 2 each of the pontoons is provided with mounting means 72 for detachably mounting a frame which includes spaced transverse members 73 and longitudinal members 74 (FIG. 7). Depending from the members 73 are skids 76 and members 77 which support a propeller shaft bearing 78. Accommodated by the bearing 78 is a propeller shaft 79 having a propeller 81 at its outer end and at its other end extending into a gear box 82. The gear box 82 is supported on the housing 83 which encloses a transverse shaft 84. Adjacent each end of the shaft and rotatable therewith are rollers 86 which as may be seen in FIGS. 1 and 2 are adapted to engage the rear wheels 11 of a vehicle accommodated on the pontoon assembly. At each of its ends the shaft 84 further carries sealed roller bearings 87 which are removably accommodated in bearing housings 88 (FIG. 1) extending from each of the pontoons. It will be evident that as the rear wheels of the vehicle are rotated this motion will be transmitted to the shaft 84 and through the gear box to the shaft 79 for rotating the propeller.

Referring again to FIG. 7, the means for guiding the structure when afloat includes a sector plate 89 carried by the pontoon 14. The plate 89 is provided with an arcuate slot 91 which accommodates a stationary pin 92 extending upwardly from the pontoon. A pin 93 extending upwardly from the plate 89 anchors one end of a tension spring 94, the other end of the spring being anchored on the pin 92. The concave margin of the slot 91 is thus urged into engagement with the pin 92 so that the plate 89 is angularly movable upon the pontoons 14. The pin 93 further pivotally accommodates the appropriately apertured end of a connecting rod 96 which is pivotally attached to a member 97 extending from a rudder member 98 pivotally mounted at 99 on the downwardly extending portion of one of the skid structures 76.

The plate 89 carries spaced rollers 101 at its linear marginal edge, the rollers being positioned so as to contact the front wheel 11a of the vehicle accommodated on the pontoon assembly. Steering motion of the front wheel 11a is thus transmitted through the plate 89 and the connecting rod 96 to the rudder 98. It will be understood that, as previously mentioned, a duplicate of the pontoon supporting framework of FIG. 1 is located at the front of the vehicle. This front framework section carries clamping structures identical to those indicated at 18 (FIG. 3) which grasp the front bumper of the vehicle and permit the front wheels of the vehicle to be suspended adjacent the pontoon sides.

From the foregoing it will be evident that with the pontoon assembly clamped to the bumper or frame of a motor vehicle, and with the lifting element 51 in its upper, broken line position of FIG. 2, the pontoons will be stowed above the vehicle which may be driven in conventional fashion. When the structure is to be set afloat, the vehicle is driven to axle depth in the water and by means of the motor 41 the pontoons are lowered so as to lift the motor vehicle above the ground. The propeller shaft and its supported assembly may then be put in place between the pontoons and the lifting element 51 lowered slightly so as to cause the rear wheels of the vehicle to engage the rollers 86. Operation of the vehicle engine may then be utilized to move the structure further into the water and the conventional vehicle steering gear may be used to guide the structure when afloat. When the vehicle is to be removed from the water, it may be operated in reverse, backing the structure to the water's edge, from which point the pontoons may again be raised to stowed position. The skids 76 prevent damage to the propeller and rudder during this removal operation.

From the foregoing it will be evident that the present invention provides a detachable pontoon assembly which can be conveniently and rapidly moved between stowed and operating positions. It can be steered from the conventional automobile steering gear. The pontoons are preferably formed of riveted aluminum sections. The supporting structure except for the arms 46 and 47 and the angle irons and clamping members 17 and 18 is also formed of aluminum. The over-all weight of the structure is thus relatively low and of the order of four hundred pounds.

It will be understood that the framework shown in

FIGS. 4 and 5 can be bolted or clamped to the frame of the auto or to the metal between the frame and bumper, if desired. If added support is necessary, support elements (not shown) may be added to extend from the framework shown in FIGS. 4 and 5 to the auto frame.

Various modifications of the present invention may occur to those skilled in the art; however, the invention is to be limited only by the scope of the appended claims.

I claim:

1. A detachable pontoon assembly for rendering amphibious an automobile or the like comprising: a pontoon supporting framework adapted to be clamped to the front and rear bumpers of an automobile, said framework including a generally U-shaped stationary member having vertically upstanding legs disposed adjacent the sides of the automobile, an arm pivotally supported at one end adjacent each of said legs, said arms crossing each other and extending outboard of the automobile wheels, pontoons pivotally carried by the extending free ends of said arms, a vertically extending member supported on the base of said U-shaped member and extending above the top of the automobile, a lifting element engaging both of said arms at their point of crossing and moveable along said vertically extending member, and power means supported on said framework for moving said lifting member whereby the point of crossing of said arms is vertically displaced to move said pontoons between an operative position adjacent the automobile wheels and a stowed position above the automobile.

2. A detachable pontoon assembly for rendering amphibious an automobile or the like comprising: a pontoon supporting framework adapted to be clamped to the front and rear of an automobile, said framework including a stationary member having vertically upstanding legs disposed adjacent the sides of the automobile, an arm pivotally supported at one end adjacent each of said legs, said arms crossing each other and extending outboard of the automobile wheels, pontoons pivotally carried by the extending free ends of said arms, a vertically extending member supported on the base of said stationary member and extending above the top of the automobile, a lifting element engaging both of said arms at their point of crossing and moveable along said vertically extending member, and power means supported on said framework for moving said lifting member whereby the point of crossing of said arms is vertically displaced to move said pontoons between an operative position adjacent the automobile wheels and a stowed position above the automobile.

References Cited in the file of this patent

UNITED STATES PATENTS

| 1,804,262 | Lewis | May 5, 1931 |

FOREIGN PATENTS

| 432,120 | Great Britain | July 22, 1935 |
| 501,126 | Italy | Nov. 23, 1954 |